May 6, 1969 T. A. GRIFFIN ET AL 3,442,007

PROCESS OF ATTACHING A COLLECTOR GRID TO A PHOTOVOLTAIC CELL

Filed Dec. 29, 1966

THOMAS A. GRIFFIN
RICHARD J. HUMRICK
EDWIN R. HILL INVENTORS

Walter J. Monacelli ATTORNEY

United States Patent Office 3,442,007
Patented May 6, 1969

3,442,007
PROCESS OF ATTACHING A COLLECTOR GRID TO A PHOTOVOLTAIC CELL

Thomas A. Griffin, Lakewood, Richard J. Humrick, Parma Heights, and Edwin R. Hill, Chardon, Ohio, assignors to Kewanee Oil Company, Bryn Mawr, Pa., a corporation of Delaware Filed Dec. 29, 1966, Ser. No. 605,864
Int. Cl. B23k *31/02*; C09j *5/00*
U.S. Cl. 29—472.9 3 Claims

ABSTRACT OF THE DISCLOSURE

Process for affixing a collector grid on the barrier of a cadmium sulfide solar cell by means of heat and pressure applied to the collector grid as it is superimposed on the barrier. Preferably the heat and pressure is applied incrementally to the collector grid and barrier, advantageously by passing through heated rolls.

Figure 1:
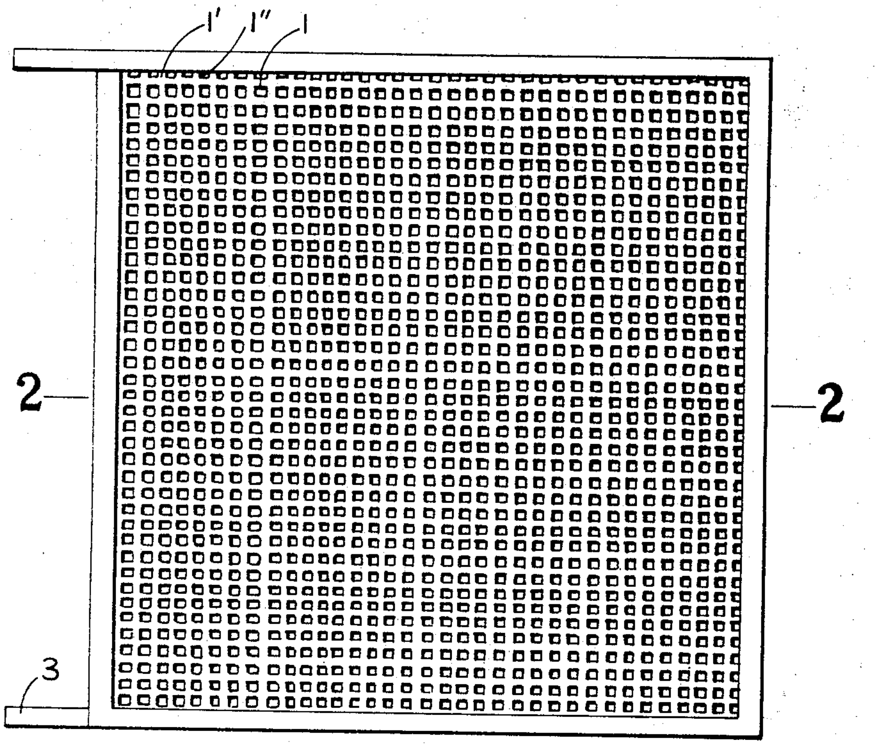

This invention relates to a process of attaching a collector grid to the barrier of a cadmium sulfide solar cell. More specifically, it relates to a method of applying and adhering an electroformed mesh onto the barrier of a cadmium culfide solar cell by the application of heat and pressure.

Cadmium sulfide solar cells operate on the principle of converting light energy to electrical energy. These cells comprise a thin film of cadmium sulfide deposited on a substrate such as a thin film of molybdenum. On one surface of the cadmium sulfide a barrier of copper sulfide is formed.

Without going into an explanation of how it is generated, the incidence of light on the barrier, or as some maintain, on the cadmium sulfide, effects a voltage between the cadmium sulfide layer and the barrier. By connecting appropriate lead wires to the barrier and to the cadmium sulfide film or metal substrate, a circuit can be formed for the flow of electrical current. In order to collect this current from the barrier, a "collector grid" is applied to the barrier to overcome "sheet resistance."

In the early development of solar cells, a collector grid was applied to the barrier layer of a cadmium sulfide solar cell by drawing stripes with a ruling pen using a silver paste as the ink. However, poor adhesion, wide lines, and irregularities in width of lines presented problems in light transmission and electrical conductivity.

Consequently this encouraged the development of an electroformed mesh having a high light transmission, that is about 85%. Such a mesh can be used as the grid and this has been affixed by laminating plastic on the front face or barrier of the cell. This technique doubled the average cell conversion efficiency.

However, during lamination there is generally some movement of the grid such that some of the plastic flows under the grid. This results in a lowering of the collection efficiency. Moreover, while these cells are superior to those previously developed they are not capable of the necessary two-year or 10,000 cycles in space simulation.

Another development has been the electrodeposited grid which, although it provides the required two-year minimum lifetime, requires further development. Consequently, it is desirable to have the high lifetime of the electrodeposited grid and the high efficiency of the electroformed grid.

Upon attempting to effect adhesion of an electroformed grid to the barrier by the application of pressure, it is found necessary, before proper adhesion can be effected, that the cell and grid must be heated to a minimum temperature before the applied pressure will effect adhesion. However, it is found that heating the entire cell is very often detrimental to the cell, particularly since it takes a substantial time to raise the whole cell to the desired temperature and a subsequent substantial time to cool the cell.

In accordance with a preferred modification of the process of this invention, it has been found that the cell can be heated and pressed progressively by heating and pressing increments of small areas in such a manner that the time for heating and cooling the respective small areas is much less and therefore not harmful to the cell.

While various other methods of heating and cooling of incremental areas may be used, it has been found particularly advantageous to use heated rolls for the application of the heat and pressure. Thus the cell and grid can be fed into heated rolls at such a rate that the grid and cell are heated to the desired temperature by the heated roll and the appropriate pressure applied simultaneously to effect satisfactory adhesion. By heating the relatively small areas progressively and subsequently allowing them to cool, the period of heating of any particular area is much shorter and offers less risk to damaging the cell. While the application of the heat and pressure by means of heated rolls is preferred, is is also possible by applying heated platens of relatively small areas to heat and press progressively throughout the overall area of the grid. It is thereby possible to apply the heat and pressure incrementally throughout the entire area of the barrier so as to effect appropriate adhesion of the collector grid thereto with little risk of damage to the cell.

Figure 2:
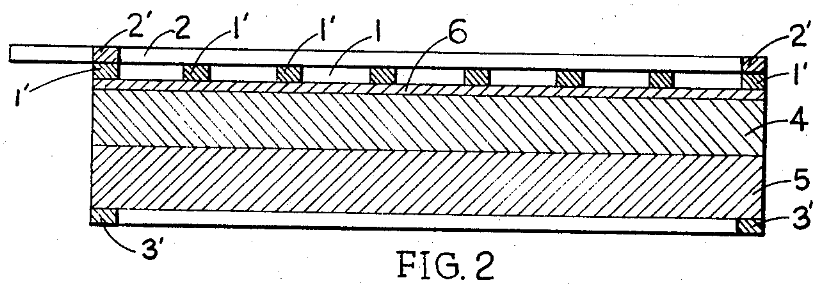

In the drawings, FIG. 1 is a top view of a grid imposed on the top surface of the barrier of a photovoltaic cell;

FIG. 2 is a side-elevational view of the combined collector grid and photovoltaic cell shown in FIG. 1, taken at line 2—2.

The major problem in lamination of the cadmium sulfide solar cell is to keep the metal of the collector grid firmly adheared against the barrier. If plastic is used to encase the cell, the metal of the collector grid, if not properly adhered, tends to float away from the surface of the barrier and up into the plastic. If any type of adhesive is used to adhere the collector grid to the barrier, this adhesive defeats the purpose of he collector grid in that it insulates the collector grid and interferes with conduction of current from the barrier to the grid. While conductive adhesives may be used they offer appreciable resistance to the flow of current.

The collector grid actually comprises a metal mesh having numerous openings to allow the passage of light therethrough and thus reach the barrier. The greater the percentage porosity of the collector grid, the more light is permitted to reach the barrier. Therefore, it is desirable to have as high a percentage as possible of porosity consistent with good conduction and contact of the grid with the barrier. Ideally, maximum power is attained with maximum area exposed to light. However, multiple conductors are required to provide short current paths for collection of the current generated. This reduces the amount of light received. Advantageously about 85% or at least 75% open space is preferred. Gold, copper, silver and nickel mesh of this high percentage open space is available.

While copper and nickel are found rather difficult to adhere directly to the barrier surface, gold is very susceptible by the application of heat and pressure to effecting good adhesion between the gold and the barrier. By applying a bismuth or gold coating to copper or nickel, either by vacuum deposition, electrodeposition, or immersion, or by electrodepositing a mossy copper on copper, it is possible to effect adhesion of copper and nickel grids to a barrier by the application of heat and pressure. Photovoltaic cells of this type are found to have good power efficiency. While copper and nickel grids can also be coated with tin and made to adhere very effectively to the barrier, the tin interface interferes with the power efficiency of the cell.

The adherence of the collector grid to the barrier according to the practice of this invention makes it possible to produce cadmium sulfide thin film cells without complete encapsulaiton in plastic and also provides a quick method for the application of the grid with improved thermal cycle reliability and the efficient operation of the cell.

In the drawings, the top view in FIG. 1 shows the collector grid 1. The barrier on which the grid is superimposed cannot be seen in this view since it is hidden by the grid. Lead wire 2 is superimposed and affixed to the collector grid at its periphery. Lead wire 3 is shown only in the section extending from underneath the cell as shown more clearly in FIG. 2.

FIG. 2 shows the elevational cross-sectional view of the solar cell and collector grid taken at line 2—2 of FIG. 1. This cross-sectional view is not to scale since it would be impossible to show in a drawing the true thicknesses of the grid and cell elements. Transverse sections of the grid cut by the cross-section are shown as 1′ and transverse sections of the lead wire 2 encircling the periphery of the grid are shown as 2′. The barrier is shown as 6 and is superimposed on the cadmium sulfide layer 4, in turn superimposed on the substrate 5, which is generally molybdenum. The lead wire 3 encircles the periphery of the under side of the substrate 5, and is shown in transverse cross-section as 3′.

In effecting adhesion of the grid to the barrier of the photovoltaic cell, it is advantageous to use a temperature of at least 200° C., preferably in the range of 200° C. to 300° C., and an "apparent pressure" of at least 5,000 p.s.i. (based on cell area), preferably in the range of 30,000 to 40,000 p.s.i. Since the grid has a substantial portion of open space the actual pressure on the solid portion will be greater than the apparent pressure. The apparent pressure is calculated by dividing the total force applied by the number of square inches of grid area.

The thickness of the mesh, whether gold, copper or nickel is advantageously in the range of 5 microns to 25 microns. The gold or bismuth coating on the copper and nickel mesh is advantageously of a thickness of at least 0.3 micron.

When the pressure is to be applied simultaneously throughout the entire area of the grid and barrier, the temperature is advantageously no higher than 300° C., preferably no higher than 275° C. so as to avoid any damage to the cell by virtue of the longer exposure to the temperature. When incremental heating and pressing of the grid and cell is effected, such as by feeding the superimposed grid and cell through heated rolls, the temperature can be 300° C. and even as high as 350° C. without any risk of having an adverse effect on the cell.

In either case, the pressure is advantageously at least about 5,000 p.s.i., preferably at least 30,000 p.s.i., with the upper limit of pressure being whatever is within the limit of practicality without doing physical damage to the cell. Generally, there is no added advantage in exceeding 40,000 p.s.i. Obviously, the time required for the application of pressure will vary according to the particular temperature and the pressures applied. However, generally at least 0.1, preferably at least 1 second is desired, with the maximum time of exposure to the pressure being limited merely by whatever adverse effect the temperature will have on the cell.

The practice of this invention is best illustrated by the following examples. These examples are given merely by way of illustration and are not intended in any way to limit the scope of the invention or the manner in which it can be practiced. Unless specifically provided otherwise, parts and percentages are given by weight.

*Example I*

A number of cadmium sulfide solar cells having a copper sulfide barrier with top area dimensions of 3″ x 3″ (Cell X–43B) are overlaid with gold mesh having approximately 85% open space and are placed between the platens of a press at various temperatures with various pressures applied. With temperatures in the range of 300–400° F. and pressures of about 150 p.s.i., the gold mesh can be pulled off the surface of the barrier after having been pressed for a few seconds. When an apparent pressure of 40,000 p.s.i. is applied at about 540° F. for 30 seconds, good adhesion is obtained between the gold mesh and the barrier. On testing, the cell shows good efficiency.

*Example II*

The procedure of Example I is repeated with good adhesion of the grid and good efficiency of the resulting cell, using in place of the gold mesh, a copper mesh having about 85% open space, which copper mesh has been coated with a very thin gold layer by electrodeposition. The lamination of the grid to the barrier is effected using an apparent pressure of 40,000 p.s.i. for 30 seconds after the temperature is raised to 540° F.

*Example III*

The procedure of Example II is repeated successfully using in place of the copper grid, a nickel grid of equivalent light transparency and having a thin gold layer applied by immersion plating.

*Example IV*

The procedures of Examples II and III are repeated successfully using bismuth-coated copper and nickel grids, and a copper-grid coated with electrodeposited copper.

*Example V*

The cell and gold mesh of Example I are fed between two driven rolls each having a radius of 1.75 inches and maintained by electrical heating at a temperature of 300° C. The rolls are in tight contact with each other prior to feeding the superimposed grid and cell between the rolls. A pressure of at least 5,000 p.s.i is applied to the rolls as the grid and cell are passed through at a linear speed of 0.7 inch per second. This calculates to a residence time of approximately 4.3 seconds for the whole cell to pass through the rolls. Excellent adhesion of the grid to the barrier of the cell and good efficiency are obtained.

*Example VI*

The procedure of Example V is repeated a number of times using in place of the gold mesh the respective meshes of Examples II–IV. In each case excellent adhesion and good efficiency are obtained.

*Example VII*

The procedures of Examples V and VI are repeated a number of times using instead of the temperature and linear speed thereof the following respectively:

(a) 250° C. and 0.35 inch per second;
(b) 350° C. and 1.4 inches per second.

In each case excellent adhesion and good efficiency are obtained.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. The process of adhering a collector grid selected from the class consisting of gold mesh, gold coated copper mesh, gold coated nickel mesh, copper coated copper mesh, bismuth coated copper mesh and bismuth coated nickel mesh onto a copper sulfide barrier of a cadmium sulfide photovoltaic cell comprising the steps of heating and maintaining the said grid and barrier at a temperature of at least 200° C. and applying an apparent pressure of at least 5,000 p.s.i. for at least 0.1 second while at said temperature.

2. The process of claim 1 in which said temperatures and said pressures are applied incrementally throughout the contacting areas of the said grid and barrier.

3. The process of claim 2 in which said incremental heating and pressing is effected by passing the cell on which the said grid is superimposed on the barrier through a heated pair of rolls heated to a temperature of at least 200° C. and adapted to apply pressure to the superimposed grid and cell of at least 5,000 p.s.i.

References Cited

UNITED STATES PATENTS

| | | | |
|---|---|---|---|
| 3,006,067 | 10/1961 | Anderson et al. | 29—472.9 |
| 3,228,104 | 1/1966 | Emeis | 29—497.5 |
| 3,376,163 | 4/1968 | Abrahamsohn | 136—89 |

JOHN F. CAMPBELL, *Primary Examiner.*

R. B. LAZARUS, *Assistant Examiner.*

U.S. Cl. X.R.

29—497.5, 589; 156—306; 161—225; 136—89